United States Patent
Barnhart

(10) Patent No.: US 10,650,692 B2
(45) Date of Patent: *May 12, 2020

(54) ENTROPY-BASED SEQUENCES OF EDUCATIONAL MODULES

(71) Applicant: Pearson Education, Inc., Bloomington, MN (US)

(72) Inventor: Randall Barnhart, Highlands Ranch, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,084

(22) Filed: May 24, 2019

(65) Prior Publication Data

US 2019/0287414 A1 Sep. 19, 2019

Related U.S. Application Data

(63) Continuation of application No. 14/499,659, filed on Sep. 29, 2014, now abandoned, which is a continuation of application No. 14/091,664, filed on Nov. 27, 2013, now Pat. No. 8,879,978.

(51) Int. Cl.
*G09B 5/02* (2006.01)
*G09B 7/00* (2006.01)

(52) U.S. Cl.
CPC .............. *G09B 5/02* (2013.01); *G09B 7/00* (2013.01)

(58) Field of Classification Search
CPC ............. G09B 5/00; G09B 5/02; G09B 7/00
See application file for complete search history.

(56) References Cited

U.S. PATENT DOCUMENTS

| | | | | |
|---|---|---|---|---|
| 8,879,978 B1 * | 11/2014 | Barnhart | ............ | G09B 7/00 434/350 |
| 2013/0011822 A1 * | 1/2013 | Messner | ............ | G09B 5/06 434/365 |

* cited by examiner

*Primary Examiner* — Robert J Utama
(74) *Attorney, Agent, or Firm* — Quarles & Brady LLP

(57) ABSTRACT

Techniques disclosed herein can determine sequences for educational units by evaluating entropies of multiple potential sequences and biasing selection of next units towards those associated with high sequence entropies. Further, an analysis can determine which units are under-represented (relative to a target proportion) in a past sequence and bias towards inclusion of an under-represented unit in the sequence. The available units that are considered for potential selection can include those matched to a learner's skill (e.g., such that all pre-requisite units have been mastered but the unit itself has not been mastered). Thus, techniques can generate sequences of units that promote unit variation and nonetheless conform to relative unit frequencies and skill level appropriateness.

20 Claims, 9 Drawing Sheets

ENTROPY-BASED SEQUENCES OF EDUCATIONAL MODULES

CROSS-REFERENCE TO RELATED APPLICATIONS

This application is a continuation of U.S. application Ser. No. 14/499,659, filed Sep. 29, 2014, which is a continuation of U.S. application Ser. No. 14/091,664, filed on Nov. 27, 2013, now U.S. Pat. No. 8,879,978, both of which are hereby incorporated by reference in its entirety for all purposes.

BACKGROUND

Conveying new educational material is difficult. On one hand, repetition of concepts is useful such that a learner is repeatedly exposed to a new concept. On the other hand, such repetition can bore a learner, such that he ceases to put forth full effort. Either way, the learner is then unable to effectively learn the new material. Many attempts have been made to keep a learner attentive and engaged.

SUMMARY

Variation can be used to promote learner engagement. During a school year, a learner may be responsible for learning multiple topics. Rather than sequentially teaching the topics, teaching of the topics can be interleaved. Such interleaving, however, requires determining a sequence for the topics. The sequence may include an ordered pattern. However, sequenced patterns often fail to reflect desired proportions of topics. In another approach, a sequence may include a random component. However, random (or pseudo-random) sequences can result in sub-sequences with low topic variability.

Sequence determination is further complicated in scenarios in which all topics are not to be equally weighted. For example, an instructor may want a first topic to be covered twice as frequently as a second topic. This weighting can work against achieving variation. Further, techniques such as utilizing random (or pseudo-random) sequences further can reduce a degree to which desired proportions can be realized.

Techniques disclosed herein can determine sequences for educational units (e.g., topic or type of content object) by evaluating entropies of multiple potential sequences and biasing selection of next units towards those associated with high sequence entropies. Further, an analysis can determine which units are under-represented (relative to a target proportion) in a past sequence and bias towards inclusion of an under-represented unit in the sequence. The available units that are considered for potential selection can include those matched to a learner's skill (e.g., such that all pre-requisite units have been mastered but the unit itself has not been mastered). Thus, techniques can generate sequences of units that promote unit variation and nonetheless conform to relative unit frequencies and skill level appropriateness.

In some embodiments, a method for determining sequences for presentation of educational content objects is provided. A set of educational topics is identified. A target proportion of representation of an educational topic in the set of educational topics within a sequence of topics is identified. A past sequence of topics is accessed. The past sequence of topics includes a series of identifiers of topics in the set of educational topics. For each educational topic in the set of educational topics, an identifier of the educational topic is appended to the past sequence of topics to produce a potential sequence, and an entropy of the potential sequence is determined. For each topic in the set of topics, a proportion of the identifiers in the past sequence or potential sequence that identify the educational topic is determined, and a score is determined based on the entropy, the proportion and the target proportion for the educational topic. An educational topic is selected from amongst the set of educational topics based on the determined scores. The past sequence is appended with the selected educational topic.

In some embodiments, a computer-program product tangibly embodied in a non-transitory machine-readable storage medium is provided. The product includes instructions configured to cause one or more data processors to perform actions in a method disclosed herein.

In some embodiments, a system for determining sequences for presentation of educational content objects is provided. A topic availer identifies a set of educational topics. A target-proportion definer defines a target proportion of representation of an educational topic in the set of educational topics within a sequence of topics. An entropy-based sequence engine accesses a past sequence of topics, the past sequence of topics including a series of identifiers of topics in the set of educational topics. For each educational topic in the set of educational topics: the sequence engine appends an identifier of the educational topic to the past sequence of topics to produce a potential sequence and determines an entropy of the potential sequence. For each educational topic in the set of educational topics, the sequence engine determines a proportion of the identifiers in the past sequence or potential sequence that identify the educational topic and determines a score based on the entropy. The proportion and the target proportion for the educational topic. The sequence builder further selects an educational topic from amongst the set of educational topics based on the determined scores and appends the past sequence with the selected educational topic.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In some embodiments, techniques can iteratively identify a next topic to be included in an educational sequence based on an analysis of a set of potential sequences—each including a topic from an available topic set appended to an already identified (i.e., "past" or "previous" sequence) sequence. For each potential sequence, an entropy of the sequence can be calculated. Further, a proportion delta can be determined for each potential target, which includes a difference between a target proportion and a proportional presence of the topic in the past sequence (which high values representing under-representation relative to the target). A score can be generated for each potential sequence/topic, with high entropies and high proportion deltas being associated with high scores. A topic associated with a high score can be selected as a next topic for the sequence.

Figure 1:
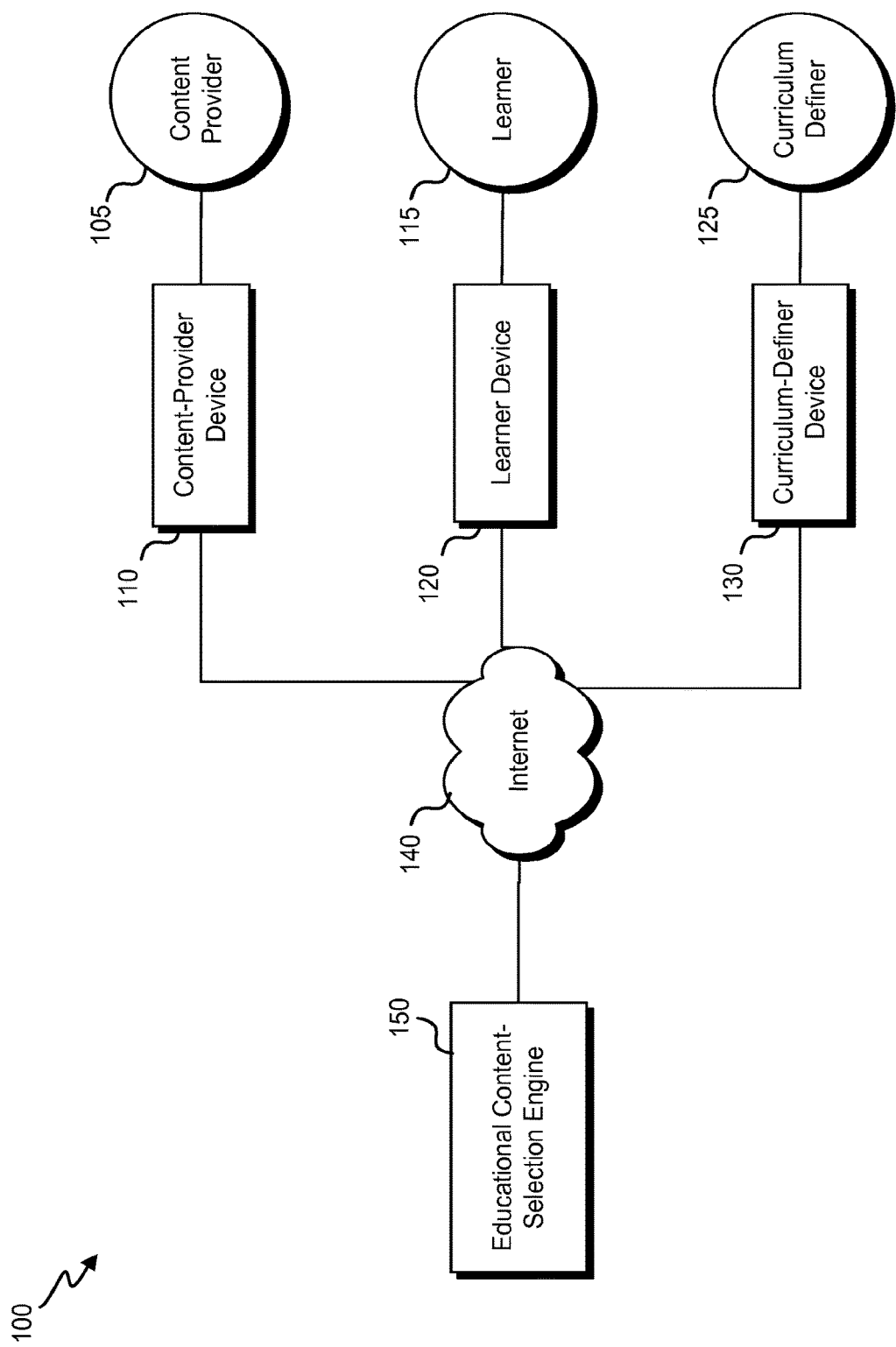
FIG. 1 depicts a block diagram of an embodiment of an educational content-presentation interaction system.

Referring first to FIG. 1, a block diagram of an embodiment of an educational content-presentation interaction system 100 is shown. A content provider 105, learner 115 and/or curriculum definer 125 can interact with an educational content-selection engine 150 via respective devices 110, 120 and/or 130 and a network, such as the Internet 140 or a wide area network (WAN), local area network (LAN) or other backbone. In some embodiments, educational content-selection engine 150 is made available to one or more of content provider 105, learner 115 and/or curriculum definer 125 via an app (that can be downloaded to and executed on a portable electronic device) or a website. It will be understood that, although only one content provider 105, learner 115 and/or curriculum definer 125 are shown, system 100 can include content providers 105, learners 115 and/or curriculum definers 125.

Content-provider device 110, learner device 120 and/or curriculum-definer device 130 can each be a single electronic device, such as a hand-held electronic device (e.g., a smartphone). It will be understood that content-provider device 110, learner device 120 and/or curriculum-definer device 130 can also include a system that includes multiple devices and/or components. Device(s) 110, 120 and/or 130 can include a computer, such as the desktop computer, a laptop computer or a tablet. In some instances, a party 105, 115 and/or 125 uses different devices at different times to interact with the educational content-selection engine 150. For example, learner 115 can use a desktop computer to access a first content object presented in a curriculum and can later use a tablet to access a second content object presented in the curriculum.

A content provider 105 can provide one or more content objects that can be made accessible to one or more learners 115. In one instance, a content library can include a set of content objects provided by one or more content providers 105. In one instance, a content library additionally or alternatively can include a set of metadata (each metadata element characterizing an associated content object), which can be provided by a content provider 105 and/or automatically generated based on provided content objects. As described in greater detail herein, educational content-selection engine 150 can identify a next topic to include in a sequence of educational topics, can identify a content object for the topic and can then avail the object to learner 115.

Content objects can include documents (e.g., articles, worksheets, or tutorials), presentations webpages and/or media files (e.g., videos, graphics or audio files). The content objects can be static or interactive, such that information presentations change based on a learner's input. For example, an interactive content object can include a quiz where a difficulty of each question depends on whether a previous response was correct. As another example, an interactive learning module can determine which information to display based on which option was selected (e.g., clicked on) by a learner. Each content object can include text and/or can be associated with one or more keywords (e.g., as specified by a content provider 105). In some instances, content provider 105 provides metadata associated with a content object, where the metadata includes characteristics of an associated content object and can include, e.g., one or more topics (e.g., keywords), a brief summary, a title, a type of object, and/or a skill level.

Educational content-selection engine 150 (or another system) can associate each content object with one or more topics. The topics can include those identified by a content provider 105 (and/or included in the object's metadata) or topics automatically determined based on analysis of the object. For example, the topic can be identified based on a content object's text, title, short description and/or keyword list. In some instances, topics are selected from amongst a topic list. Topic associations (e.g., and weights) can be stored in a central library and/or in a content object's metadata.

Content objects (and/or associated metadata) can be provided such that they can be included in a sequence for presentation to a learner. The sequence can be determined, in part, based on a curriculum defined by a curriculum definer (e.g., an instructor, course designer, school administrator, school-board representative, or webpage developer). In contrast to traditional situations, curriculum definer 125 need not (in some embodiments) identify a comprehensive schedule about which specific content objects are to be presented when). Rather, curriculum definer 125 can identify a list of topics to be covered and (in some instances) a prioritization of one or more topics (e.g., a weight, ranking or optional/required identification). Curriculum definer 125 can further identify relationships between topics, such as a specification that Topic A must be mastered before Topic B is to be presented.

Using the definitions provided by one or more curriculum definer 125, educational content-selection engine 150 can identify a sequence of educational topics to be presented. The sequence can be identified to conform to requirements about relative weighting of topics and pre-requisites of topics but to otherwise introduce an allowable degree of variability to the sequence to promote learner engagement. At one or more times, for each topic in the sequence, educational content-selection engine 150 can then identify a content object matching the topic. The content object can then be presented to learner 115. Further, a sequence can be dynamically determined, such that changes in curriculum definitions (e.g., topic weightings) or a learner's topic masteries can result in adjustment of topics to be subsequently presented.

Figure 2:
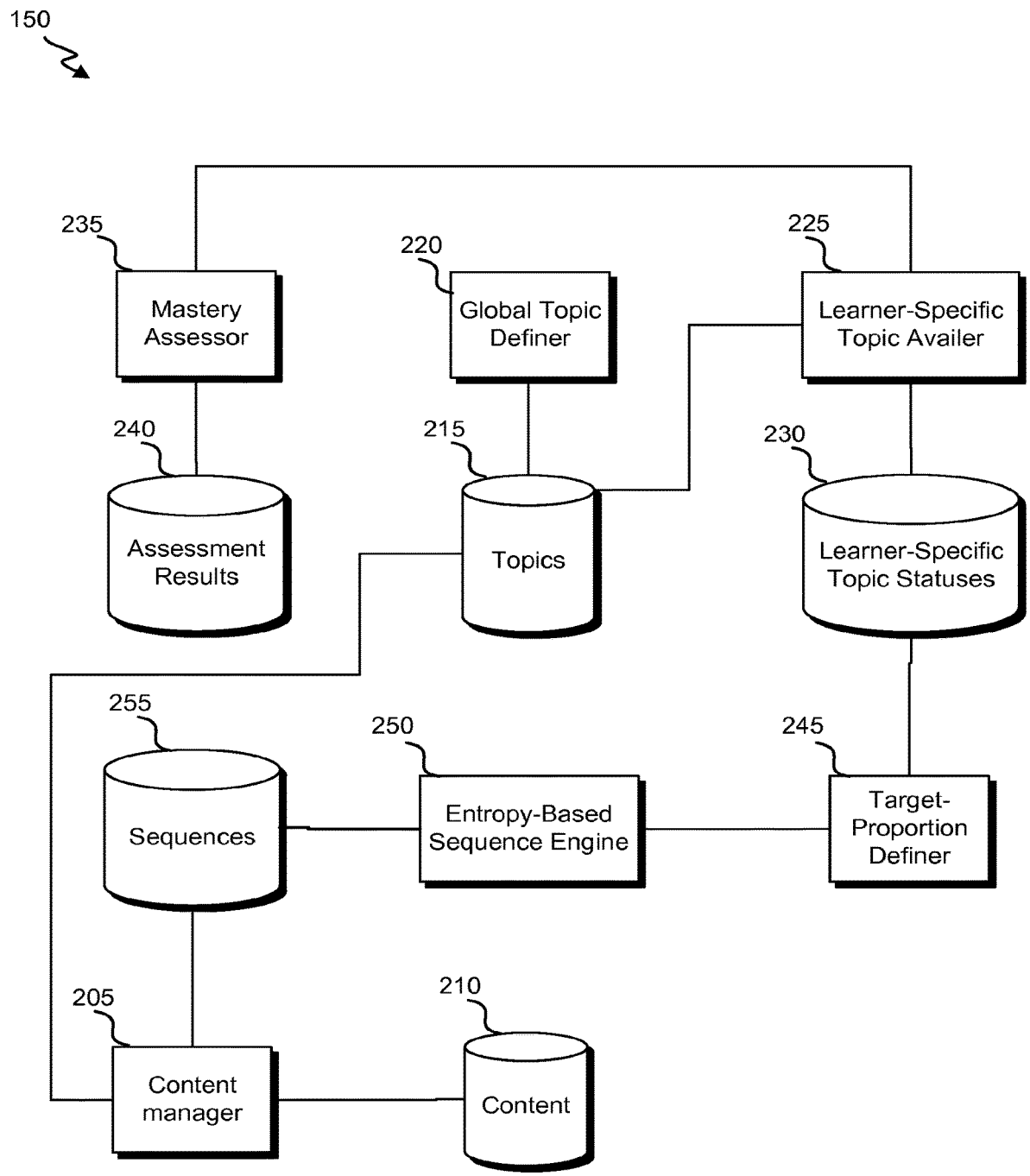
FIG. 2 depicts a block diagram of an embodiment of an educational content-selection engine.

Referring next to FIG. 2, a block diagram of an embodiment educational content-selection engine 150 is shown. Educational content-selection engine 150 can be, in part or in its entirety, in a cloud. In some instances, at least part of educational content-selection engine 150 is present on a device, such as a curriculum-definer device 130. Educational content-selection engine 150 can include be distributed across devices, such as learner device 120 and a cloud device.

Educational content-selection engine 150 can include a content manager 205 that can receive, process, store and/or retrieve content objects. For example, a content provider 105 can upload a content object via a website provided by content manager 205. Metadata for the content object can alternatively or additionally be uploaded or otherwise identified (e.g., based on manual entry into fields in a webpage). Content manager 205 can store the content objects and/or metadata in a content data store 210. In some instances, content manager 205 can itself generate metadata for a content object (e.g., identifying a source or upload time).

Metadata for a content object can include information such as an object's title, keyword list, short summary, object type, difficulty level, accessibility restriction, author and/or language. Alternatively or additionally, metadata can include one or more topics tied to the object. The topics can be identified based on input from a content provider 105 (e.g., a selection from amongst available topics during upload of an object) or automatically. For example, content manager 205 can analyze a content object's text, title, keywords, and/or summary to identify topics for the object.

Content manager 205 can access a topics data store 215 that can identify a set of available topics and defining information for each topic. For example, for a topic of "American literature", topics data store 215 can identify a list of novels' titles that are relevant for the topic. Presence of one or more of these titles in a content object or in its metadata can suggest that it relates to the topic.

In some instances, determining whether a content object relates to a particular topic is binary and/or based on a threshold analysis (e.g., does a title include a topic-associated term or do more than a threshold fraction of terms in text of an object match a topic-associated term). In some instances, the determination includes determining a weight for each of multiple concepts (e.g., or for each available concept). In this instance, for a given topic, each of one or more content objects can include a weight indicating how strongly it is estimated to relate to the topic.

A global topic definer 220 can identify available topics. This list can specify those topics which are available to include in a curriculum, to include in a sequence and/or to associate with a content object. The available topics can be determined based on input from one or more curriculum definers 125, an automated analysis of content objects (e.g., to identify prevalent non-article nouns) and/or can use a fixed list.

In some instances, each of one or more topics can be linked to a curriculum, such as a course, instructor and/or grade level. Each of one or more topics can be associated with one or more pre-requisites, identifying a topic that is to be mastered (e.g., according to a global mastery criterion or one tied to the specific topic) before the topic at issue is to be presented. In some instances, each of one or more topics (or groups of topics) is associated with an overall weight (which can include a ranking). For example, for a set of sequential fractions topics (varying in difficulty level), an instructor can assign an overall weight of 1.0 to the first two topics (indicating that it is essential that a learner master these topics), 0.75 to the third, 0.5 to the fourth and 0.1 to the fifth. While in some instances an overall weight is global, in other instances, a weight can be specifically associated with a particular curriculum.

While an overall weight can reflect an importance of ultimately mastering a topic during a curriculum, the weight can differ from a current weight. For example, it may be very important to master Fraction Topic B (e.g., associated with a 1.0 overall weight), but it may be disadvantageous to present Fraction Topic B until after Fraction Topic A is mastered. Further, while it may be important that a learner ultimately master a U.S. Geography Topic, it may be unexpected that a learner would master this topic early in a course (e.g., such that mastery importance increases with time). Thus, a current topic weight can depend on a time and/or a particular learner (e.g., and her topic masteries).

Thus, a learner-specific topic availer 225 can identify which topics are to be currently available for inclusion in a sequence for a particular learner. Each available topic can then be associated with a current learner-specific weight. This weight can depend on overall weights, users' ties to various curriculums, a relative or absolute time (e.g., time point within a course schedule) and/or masteries (or current performances) of the learner.

A topic weight database 230 can store, for each of one or more learners, a current weight for each of one or more topics. In some instances, each of one or more topic weights is further associated with a curriculum. For example, Learner A may be enrolled in an English course and a journalism course, each associated with a curriculum. Both curriculums may identify "grammar" as a topic, though this topic may be more important for the English course as compared to the journalism course. In one instance, a weight is assigned to the topic for the user based on the topic's importance for both courses. In another instances, different weights are assigned in association with each course.

The assigned weights and/or available topics can depend on a particular user's performance on assessment and/or mastery of topics. Assessments can be periodically given (e.g., as part of a sequence or separately) to evaluate a learner's understanding of a topic. An assessment can be static (e.g., including a fixed set of questions to be presented to a user) or dynamic (e.g., such that presentation of questions or materials depends on accuracy of previous learner responses and/or interactions). A mastery assessor 235 can generate a score for an assessment based on a number or percentage of questions answered correctly, a number of consecutive questions (or number of questions in a sequential group) answered correctly (e.g., where question difficulty changes depending on accuracy of past answer accuracy), a degree to which one or more questions were answered correctly and/or a speed of responses.

Mastery assessor 235 can use the score to estimate a learner's understanding of a topic and/or whether he has mastered the topic. A mastery criterion can be established for each of one, more or all topics. The criterion can include a threshold score, such that it is determined that a learner has mastered a topic when she completes an assessment with a score above the threshold.

Mastery assessor 235 can store assessment results in an assessment-results data store 240. The results can include—for each of one or more topics—a score, a performance level and/or whether the topic has been mastered. Each result can be associated with a learner. The result can be further associated with an absolute or relative time and/or non-current results can be deleted. Thus, e.g., learner-specific topic availer 225 can poll mastery assessor 235 for current performance metrics and/or masteries for a given learner, and mastery assessor 235 can identify the results from data store 240. Learner-specific topic availer can then set learner-specific topic weights based on the identified performances.

For example, suppose that a curriculum provider indicates that it is important that learners master Topic N by week 8, and that Learners A and B are performing at 30% and 80% levels, respectively, at week 6 (with 90% being mastery). A current learner-specific weight of Topic N can be set higher for Learner A as compared to Learner B, given that it appears as though Learner A requires more exposure to the topic than Learner B.

Based on the learner-specific topic availabilities and weights, a target-proportion definer 245 can identify a set of target or desired proportions, where each proportion identifies a target fraction of a sequence devoted to a particular topic. In one instance, target-proportion definer 245 can identify a set of topics available to a learner for a given curriculum. Respective target sequence proportions can be set by normalizing the weights of those topics relative to the weights' sum.

In one instance, a curriculum definer 125 identifies a set of topic areas. Each topic area can be associated with one or more topics (e.g., of various skill levels). Curriculum definer 125 can identify a weight for each topic area. Initially, target proportions can be defined based on each topic area in the set of topic areas. Subsequently, however, a learner may master all topics in a topic group, such that a number of topic areas available is lowered. The target proportions can then still be determined using the weights, though the target proportion assigned to a topic area can increase due to the smaller number of available topic areas.

In one instance, target proportions are set using weights corresponding to multiple curricula. For example, a learner may be enrolled in a six-hour course and a three-hour course. Target-proportion definer 245 can then identify a set of topics as those available in the context of either course, and target proportions can be defined based on the weights, but over-weighting topics for the six-hour course relative to those for the three-hour course.

Figure 3:
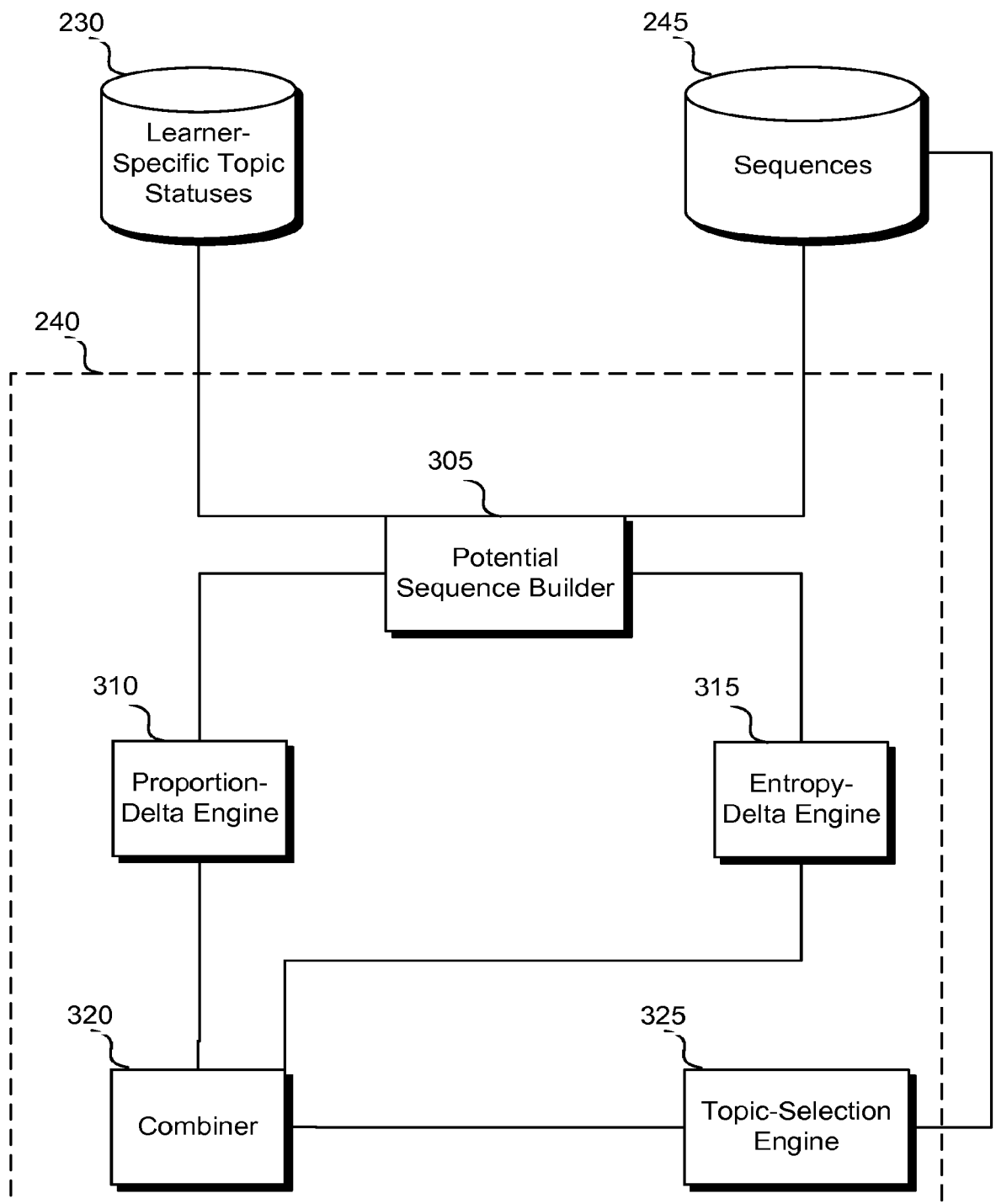
FIG. 3 depicts a block diagram of an embodiment of an entropy-based sequence engine.

An entropy-based sequence engine 420 can successively build a sequence using the target proportions and an entropy analysis. FIG. 3 shows a block diagram of an embodiment entropy-based sequence engine 250. Entropy-based sequence engine 250 includes a potential sequence builder 305 that can access a past sequence (e.g., a sequence already determined or already presented) from a sequence data store 255 and further identifies all topics available to a learner based on learner-specific topic availabilities identified in learner-specific topic status data store 230. Potential sequence builder 305 can then construct a set of potential sequences—each including an available topic (or a set of available topics) appended to the past sequence. In some instances, a potential sequence is generated for each available topic.

For each potential topic included in a respective potential sequence, a proportion-delta engine 310 identifies a proportion of the past sequence corresponding to a particular topic (or topic area). Proportion-delta engine 310 can compare the determined proportion) to a corresponding target proportion. One or more proportion-assessment metrics can be determined based on the comparison. For example, the metric can include a normalized (e.g., based on asize of the past sequence, the target proportion for the topic, an average target proportion, or a maximum or minimum target proportion) or unnormalized difference between an actual and target proportion. Thus, a high (positive) delta can indicate that the potential topic is underrepresented in a past sequence, and a low (negative) delta can indicate that the potential topic is overrepresented in a past sequence.

It will be appreciated that alternative embodiments can analyze a proportion of one or more topics (e.g., the potential topic) in the potential sequence. For example, the analysis can include determining whether one or more proportions (e.g., a proportion for the potential topic or a proportion for each topic) better conforms to the target proportions relative to other potential sequences or a past sequence. To illustrate, a proportion-delta metric can determine an absolute difference between a proportion of each topic in the potential sequence relative to corresponding target proportion and sum the differences across topics. Low metrics can be indicative of potential sequences nearing or achieving the target proportions.

An entropy-delta engine 315 can identify an entropy for each potential sequence. The entropy can be determined using an algorithm to assess variation in a sequence. The entropy can include a Shannon entropy, which can include a cumulative sum (over topics in part or all of a sequence) of a product of a probability of a topic occurring in part or all of a sequence and a base-2 log of the probability. The probability can be defined to equal a fraction of the analyzed (part or all of the) sequence corresponding to the topic.

In one instance, rather than computing the entropy over an entire sequence, an entropy is calculated for each of one or more portions (e.g., of a fixed length, such as a length equal to a number of available topics) of a sequence. In an instance where a single portion is analyzed, the portion can include an end of the potential sequence, such that the potential topic is represented in the portion. In an instance where multiple portions are analyzed, at least one portion can include an end of the potential sequence, and the portions can be overlapping (e.g., overlap of one topic) or non-overlapping. When an entropy is determined for multiple portions, an average entropy can be computed as an average of the portions' entropies, or the portions' entropies can otherwise be combined and represented in a population statistic. It will be appreciated that disclosures herein that refer to an "entropy" can refer to a raw entropy or an average entropy.

An entropy metric can be generated based on the entropy (e.g., or average entropy). The entropy metric can be the entropy and/or can be based on a difference using the entropy (e.g., an average entropy for the potential sequence minus an average entropy for the past sequence).

For each potential sequence, a combiner 320 can combine the proportion metric and the entropy metric to generate a score. Initially, combiner 320 can normalize each of the proportion metric and the entropy metric based on those identified for other potential sequences. For example, the proportion metric can be normalized using a standard deviation of proportion metrics identified across a set of potential sequences generated by potential sequence builder 305 and/or the entropy metric can be normalized using a standard deviation of entropy metrics identified across a set of entropy metrics. In one instance—for each metric—a normalized metric indicates which sigma group the metric was in, such that a "1.0" indicates that the metric is within one standard deviation from the mean and is above the mean and "−2.0" indicates that the metric is between 1-2 standard deviarions below the mean. As another example, the proportion metric can be normalized by a maximum proportion metric determined for the generated potential sequences, and the entropy metric can be normalized by a maximum entropy metric determined for the generated potential sequences.

Following the normalization, combiner 320 can combine—for each potential sequence—the normalized proportion metric and entropy to arrive at a score. In some instances, the normalized proportion metric and entropy are weighted, to favor variation or target-proportion realization.

A topic-selection engine 320 can identify a potential sequence associated with a highest score. The potential topic included in the potential sequence can be selected for the next topic to include in the sequence. Sequence data store 255 can be updated to reflect the updated sequence (e.g., stored in association with a curriculum, course, learner and/or time).

Content manager 205 can then identify a content object corresponding to the newly selected topic. The content object can be selected based on content objects' weights for the topic (e.g., biasing selections towards those with high topic weights), which content objects have already been presented (or are scheduled for presentations) in association with the previous sequences, selection biases or limitations specified by a curriculum definer 125, selections amongst available options made by a learner, etc.

Figure 4:
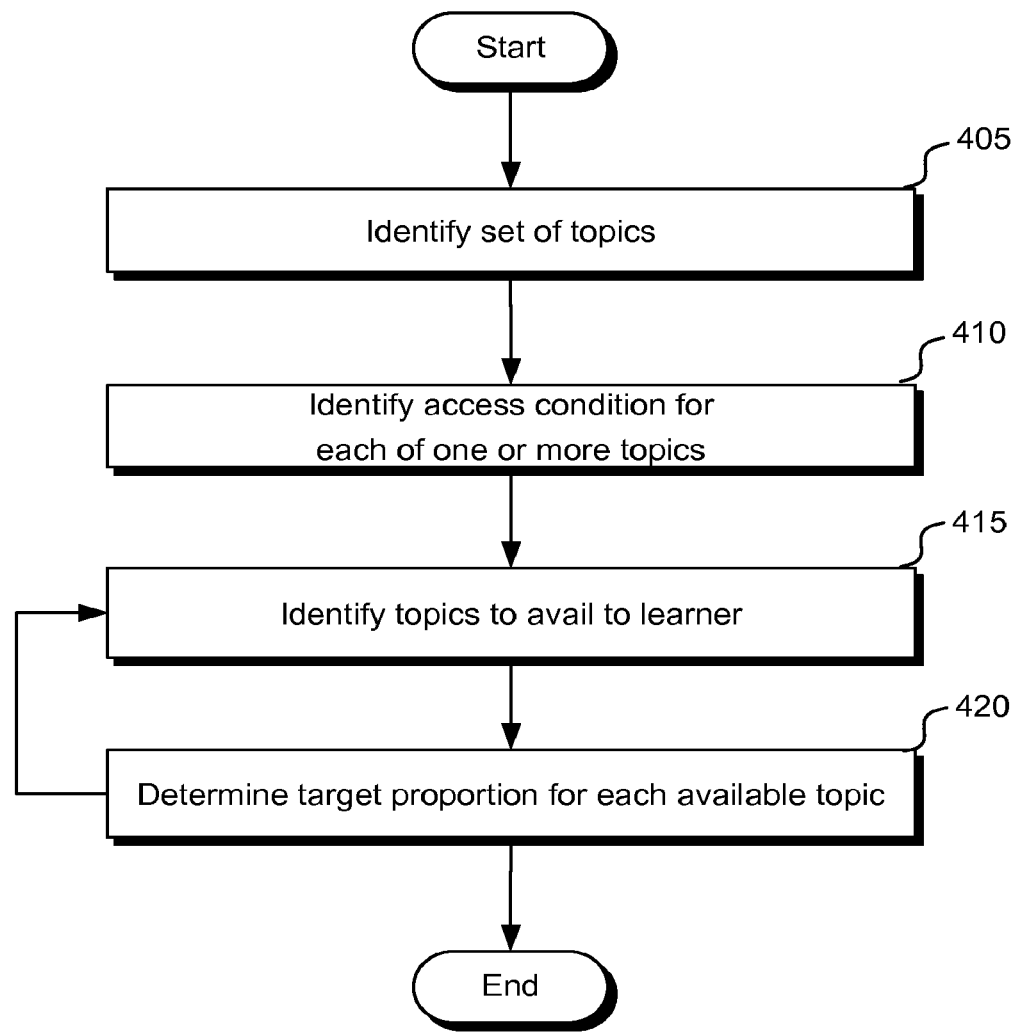
FIG. 4 illustrates a flowchart of an embodiment of a process for determining a weighted topic set.

FIG. 4 illustrates a flowchart of an embodiment of a process 400 for determining a weighted topic set. Process 400 begins at block 405 where global topic definer 220 identifies a set of topics for a curriculum. The topics can include those associated with one or more curricula, one or more courses and/or a learner. The topics can include topics identified by one or more curriculum definers and/or associated with one or more content objects (e.g., associated with a curriculum or course).

Global topic definer 220 identifies, for each of one or more topics, a condition for accessing content objects for the topic at block 410. The condition can include a mastery or performance characteristic for another topic. For example, double-digit multiplication may require an 85% or better performance assessment for single-digit multiplication. The other topic can include a topic at a lower level within a same topic area.

The condition can include an indication that a learner is enrolled in a particular course and/or is at a particular grade level. In some instances, the condition is a time condition—indicating that a topic is only to be accessible during an absolute time period (e.g., within a given date range) or relative time period (e.g., within particular weeks within a course).

At block 415, learner-specific topic availer 225 identifies one or more curriculum topics within the set that are available to a learner. This identification can be made by determining which of the topics' conditions are satisfied. For example, for an instant topic that requires mastery of an earlier level topic in a same topic area, learner-specific topic availer 225 can determine (via mastery assessor 235) whether the learner has mastered the earlier level topic. If so, learner-specific topic availer 225 can determine that content objects for the instant topic are to be made available to the learner.

Target-proportion definer 245 determines a target proportion for each available topic at block 420. The target proportion can depend on a weight (defined by a curriculum provider 125 for the topic or for the topic area. The target proportion can depend on a number of topics available to the learner, a level of the topic (e.g., where lower-level topics may be more heavily weighted). In some instances, the target proportion depends on a preference identified by the learner.

Figure 5:
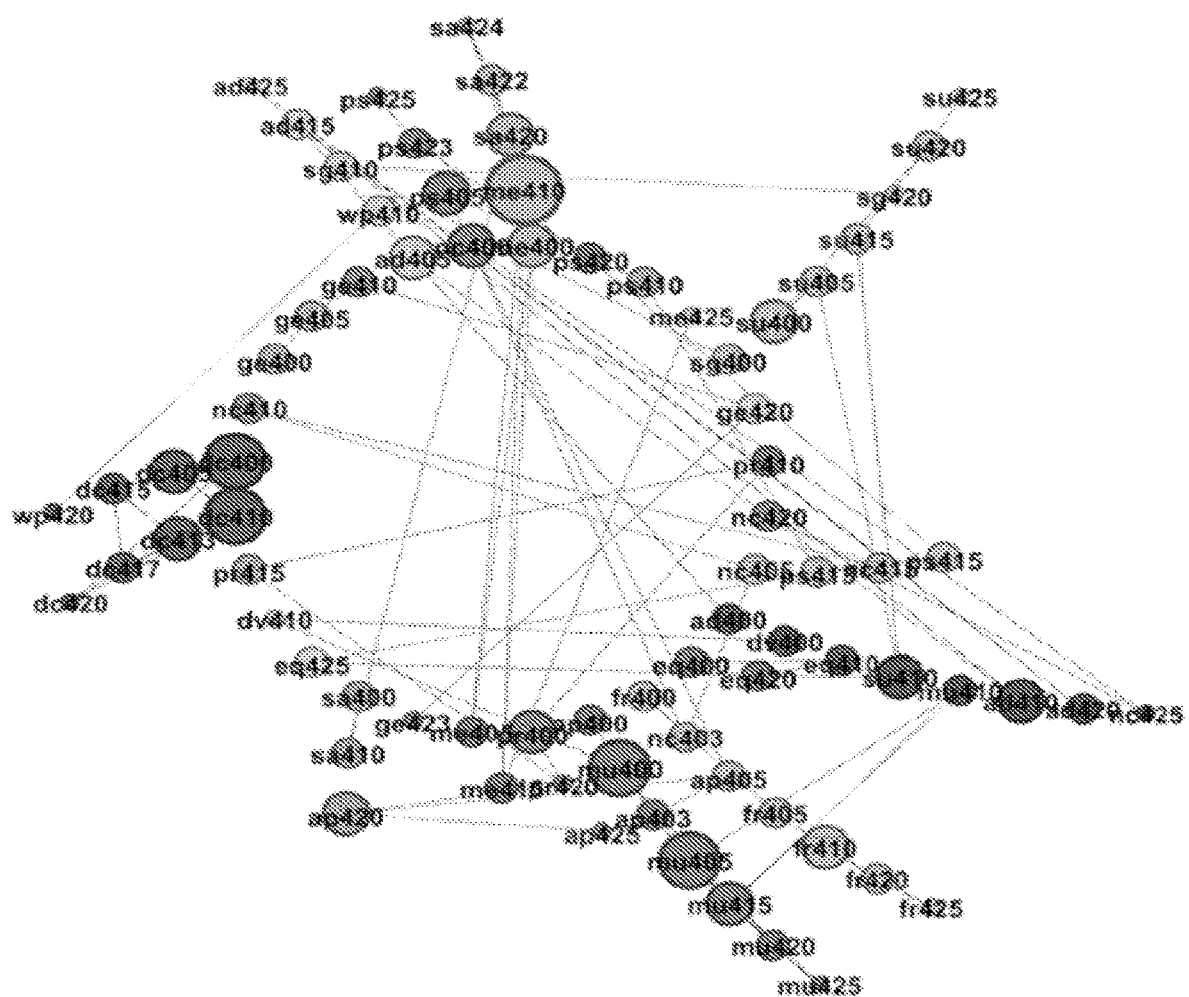
FIG. 5 illustrates a learner-specific topic ring identifying available topics.

FIG. 5 illustrates a learner-specific topic ring identifying available topics. Each circle represents a topic. The circles along the ring represent those that are available to a learner. A set of leafs extend from the leaf. Each leaf corresponds to a topic area. Within a leaf, a first topic in the leaf that is more proximate to the ring is to be made available to a learner before a second topic in the leaf further from the ring. For example, a more central topic may be a pre-requisite for a more distal topic. In one instance, the topics in a leaf represent various levels for a topic area.

Each of one or more topics may be associated a completion criterion. The completion criterion can include a mastery criterion or performance-related criterion. The completion criterion can specify a threshold score or completion time for one or more assessments or interactive modules associated with the topic. Alternatively or additionally, the completion criterion can include an absolute time (e.g., Mar. 1, 2014), relative time (e.g., Week 5 of Course A) or functional time (e.g., after 150 content-object presentations, after 5 hours of sequenced presentations or after a learner has mastered another topic) for the topic to be completed.

Learner-specific topic availer 225 can determine when completion criteria are satisfied for topics on the ring. For topics for which the completion criteria is satisfied, representations of the topics can be removed from the topic scheme (e.g., such that they are removed from the ring and/or a leaf). When the completed topic is part of a leaf, a topic behind the completed topic in the leaf can be moved to the ring, such that content objects for the topic can be made available to the learner. When the completed topic is not part of a leaf, the ring can shrink, in that fewer topics are included in the ring. Either situation can result in a change to the proportions of other topics in the ring (e.g., due to a different number of topics in the ring or due to a different weight of a newly included topic in the ring).

Figure 6:
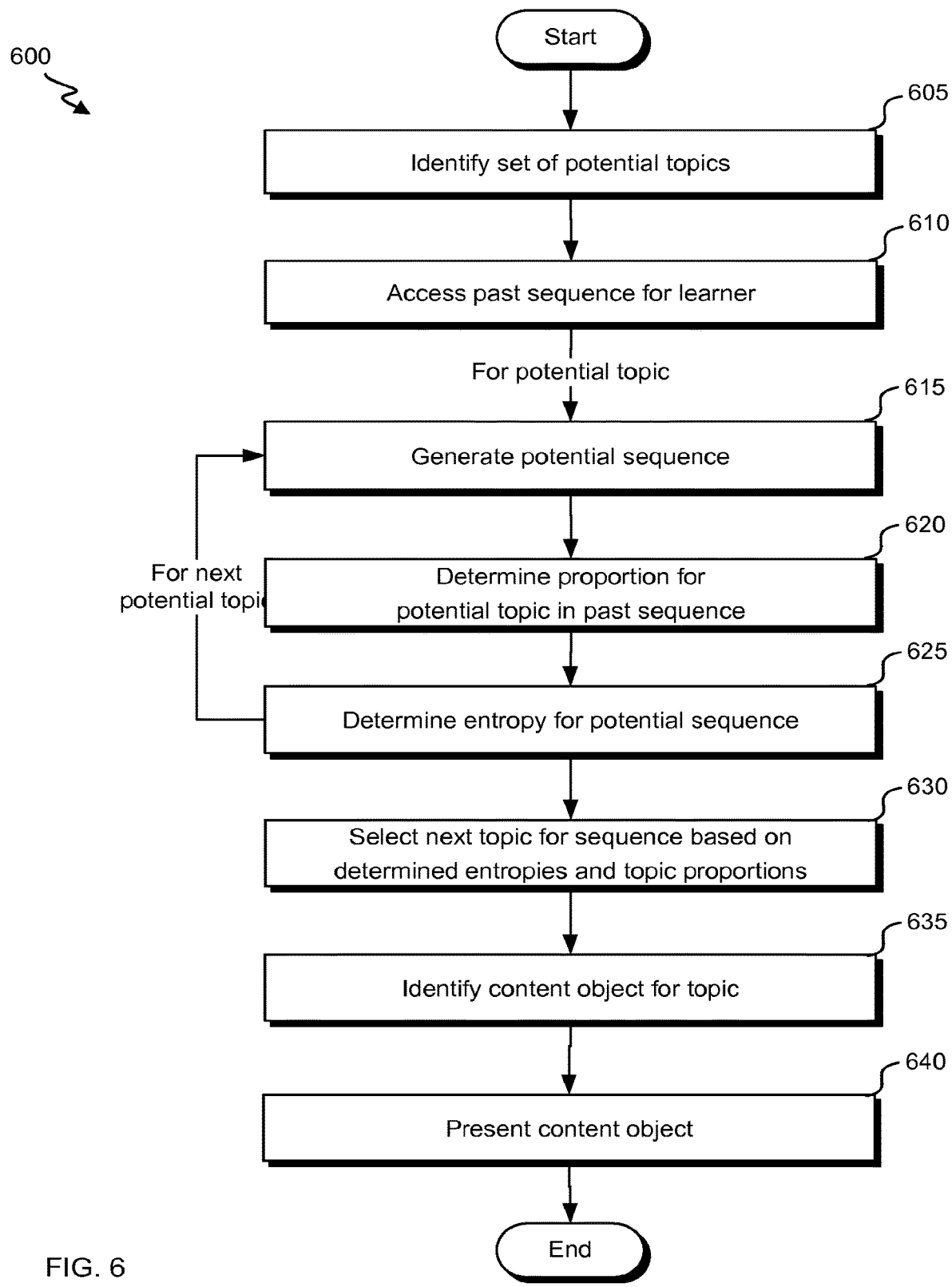
FIG. 6 illustrates a flowchart of an embodiment of a process for identifying a next content object to be presented in a sequence based on an entropy and proportion analysis.

FIG. 6 illustrates a flowchart of an embodiment of a process 600 for identifying a next content object to be presented in a sequence based on an entropy and proportion analysis. Process 600 begins at block 605 where potential sequence builder 305 identifies a set of potential topics. The potential topics can include those in a particular curriculum and/or those accessible to a learner (e.g., within a learner-specific topic ring). The potential topics can be identified by looking up the learner and/or a curriculum (or course or instructor) in learn-specific topic status data store 230.

Potential sequence builder 305 accesses a past sequence for a learner at block 610. The past sequence can include a list of topic identifiers and can be stored in a sequence data store 255 in associated with the learner and/or a curriculum (or course or instructor). The past sequence can include a sequence of topics already determined and/or a series of topics for which corresponding content objects have been presented (e.g., in an order corresponding to a sequence order). It will be appreciated that the sequence can include a list of topic identifiers.

Process 600 them performs blocks 615-620 for each potential topic in the set of topics. At block 615, potential sequence builder 305 generates a potential sequence. The potential sequence can be generated by appending the potential topic to the past sequence.

At block 620, proportion-delta engine 310 determines a proportion for the potential topic. The proportion can include the proportion of the past sequence of the potential sequence corresponding to the potential topic. A corresponding proportion delta metric can be determined using the determined proportion and a target proportion (e.g., subtracting the determined proportion from a target proportion).

At block 625, entropy-delta engine 315 determines an entropy (e.g., average entropy. A corresponding entropy delta metric can be determined using the determined entropy. For example, an entropy metric can be defined based on a difference between an average entropy for a potential sequence and an average entropy for the past sequence.

In this manner, a set of proportion and delta metrics can be generated—one for each potential topic. Any given proportion metric can be analyzed relative to other proportion metrics in the set. Similarly, a given entropy metric can be analyzed relative to other entropy metrics in the set. For example, each metric can be normalized using a standard deviation across the corresponding set of metrics (e.g., to indicate how many standard deviations the metric is from a mean of the set). As another example, each metric in a set can be ranked relative to other metrics in the set (e.g., such that an entropy ranking of "1" is assigned to for a largest entropy metric in the set).

At block 630, topic-selection engine 320 selects a next topic for the sequence based on the determined entropies and topic proportions. In one instance, for each potential topic, a population-adjusted proportion metric is combined with a population-adjusted delta metric to produce a score. The combination can include a weighted or unweighted addition. The weight can be defined, e.g., based on a learner preference of preference or specification provided by a curriculum provider.

At block 635, content manager 205 identifies a content object for the selected topic. The content object can be selected based on topic-associations of content objects, topic weights, previous content-object presentations (e.g., to bias for or against presentation of a same content object), inputs provided by a curriculum definer (e.g., identifying specific content objects presentable) or learner (e.g., identifying a preferred type of content object), a skill level associated with a content object and/or learner, and/or a pseudo-random selection. For example, content manager 205 may identify all content objects with a topic weight above a threshold for the selected topic and may then randomly select a content object. Content manager 205 causes the content object to be presented at bock 640.

Figure 7:
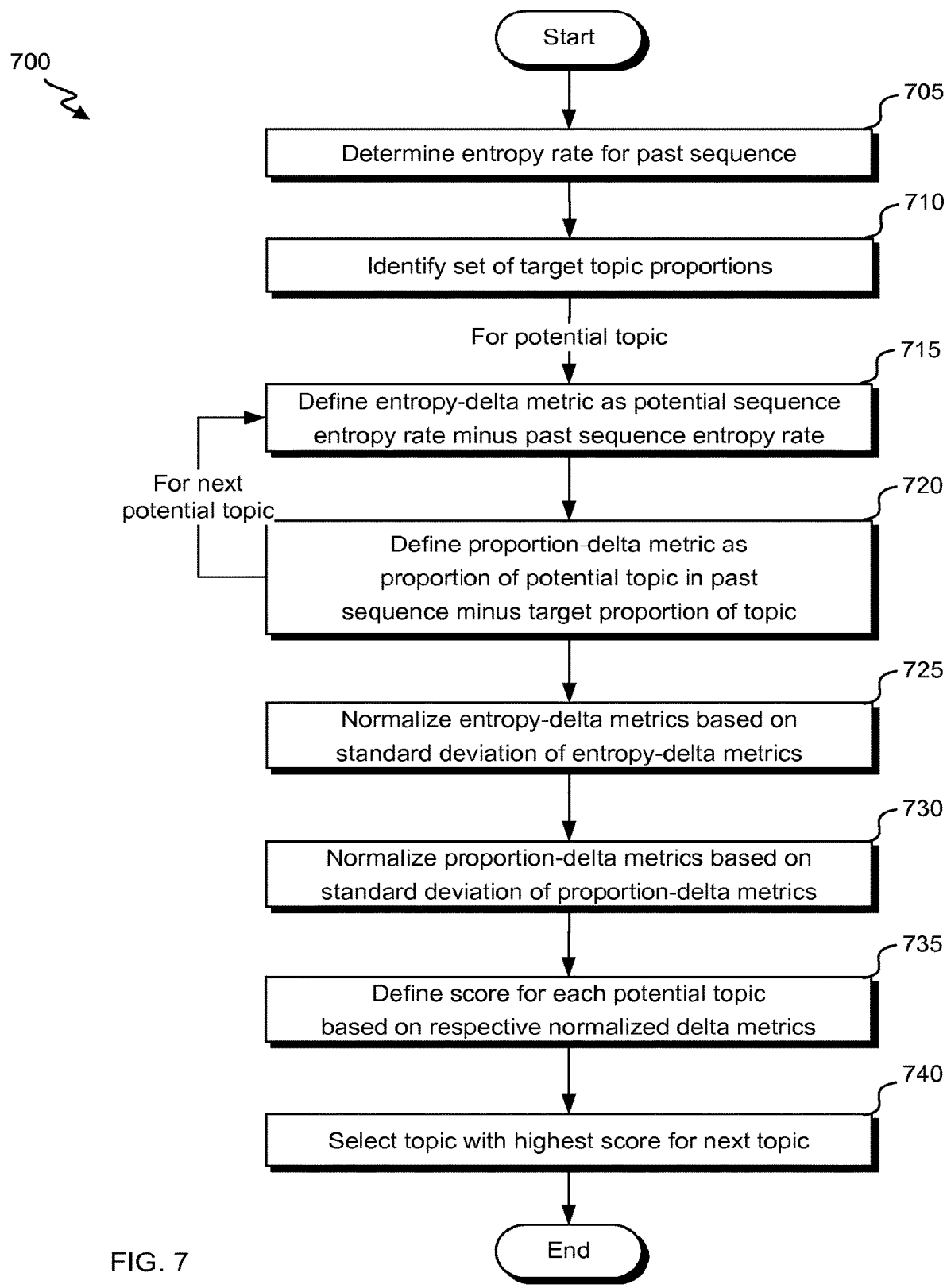
FIG. 7 illustrates a flowchart of an embodiment of a process for identifying a next topic to be presented in a sequence based on an entropy and proportion analysis.

FIG. 7 illustrates a flowchart of an embodiment of a process 700 for identifying a next topic to be presented in a sequence based on an entropy and proportion analysis. Process 700 begins at block 705 where entropy-delta engine 315 determines an average entropy for a past sequence. The past sequence can include a list or vector, with each list or vector element identifying a topic. A set of overlapping portions of the past sequence can be generated. Each portion can be of a length equal to a number of topics available for inclusion within the sequence, and each portion can be incremented one topic along the sequence (such that a length of an overlap with a previous portion is the portion length minus one). For each portion and for a given topic, a probability for that topic can be defined as a fraction of the list or vector elements in the portion corresponding to the topic. An entropy for the portion can be determined based on the probabilities across topics. For example, a Shannon entropy can be calculated. An average entropy can be determined by averaging the portion entropies.

At block 710, target-proportion definer 245 identifies a set of target topic proportions. The target proportions can include, e.g., those within a curriculum for which access conditions have been satisfied and completion criterion has not been satisfied.

Process 700 can then continue to repeat blocks 715-720 for each potential topic in a set of potential topics. For each potential topic, a potential sequence can be generated as described in relation to process 600. At block 715, entropy-delta engine 315 defines an entropy-delta metric as an average entropy for a potential sequence minus the determined average entropy for the past sequence. The average entropy for the potential sequence and the average entropy for the past sequence can be determined using a similar or same technique. It will be appreciated that, while process 700 identifies an entropy-delta metric as one relying on a subtraction, other comparison techniques (e.g., a ratio comparison) can alternatively or additionally be used.

At block 720, proportion-delta engine 310 defines a proportion-delta metric as a proportion of a potential topic in the past sequence minus the target proportion for that topic. It will again be appreciated that, while process 700 identifies a proportion-delta metric as one relying on subtraction, other comparison techniques (e.g., a ratio comparison) can alternatively or additionally be used. Further, the proportion-delta metric may alternatively or additionally depend on proportions of topics in the potential sequence and/or a proportion of the past or potential sequence corresponding to a topic is not the potential topic. For example, the topic assessed for proportions can include a target with a highest target proportion, or the proportion for each topic in a sequence or each potential topic can be determined and compared to a corresponding target proportion (e.g., and such comparisons can be aggregated to form a multi-topic proportion-delta metric).

Entropy-delta engine 315 normalizes the entropy-delta metric at block 725. The normalization can be performed using a standard deviation of the entropy-delta metrics corresponding to each potential topic in the set of potential topics. For example, the normalized entropy-delta metric can indicate how many standard deviations the metric is from a mean metric. In some instances, the normalized metric includes a rounded normalized metric, such that a metric somewhere between 1-2 standard deviations from the mean is assigned a "2.0" normalized value. The normalization can further or alternatively depend on a number of potential topics, a number of topics in a past sequence, a target proportion, a length of the potential sequence or past sequence, or a population statistic of the entropy-delta metrics corresponding to each potential topic in the set of potential topics.

Proportion-delta engine 310 normalizes the proportion-delta metric at block 730. The normalization can be performed using a standard deviation of the proportion-delta metrics corresponding to each potential topic in the set of potential topics. The normalization can include a type as described with respect to block 725. The normalization can further or alternatively depend on a proportion of one or more topics in a past sequence, a number of potential topics, a number of topics in a past sequence, a length of the potential sequence or past sequence, or a population statistic of the proportion-delta metrics corresponding to each potential topic in the set of potential topics.

At block 735, combiner 320 defines a score for each potential topic based on the respective normalized entropy-delta and proportion-delta metrics. The score can be defined based on a combination (e.g., a summation) of the proportion-delta metric and the entropy-delta metric corresponding to the topic. A weight of each delta metric can be equal or unequal (e.g., defined by a curriculum definer or a learner or based on empirical learner engagement or topic mastery).

At block 740, topic-selection engine 325 selects a topic for the sequence as the potential topic based on the scores. For example, the selected topic can include a topic with a high or highest score relative to other scores in the set. An identifier for the topic can then be added to the sequence and/or a content object corresponding to the topic can be selected for presentation.

While disclosures herein frequently refer to selection between topics, it will be appreciated that disclosed techniques can alternatively or additionally be applied to other types of selections. For example, a selection can be made from amongst types of content objects (e.g., multi-media, assessment, book chapters, etc.), question types in an assessment (e.g., word problem, logic problems or numeric problems), or skill (or intensity level). In some instances, applications of these techniques can extend beyond an education context (e.g., to select a genre for a sequence of song genres or to select an advertisement in an advertisement sequence).

Further, while disclosures herein frequently refer to selection of a single topic it will be appreciated that disclosed techniques can alternatively or additionally be applied to selection of multiple topics. For example, a set of potential topic sub-sequences (e.g., of a defined length or number of topics) can be evaluated in terms of how each potential sub-sequence would affect a sequence's entropy and/or influence a sequence's topic proportions. Analysis of multiple topics may be particularly advantageous when there are constraints on topic order (e.g., requiring that presentation of Topic A be followed by presentation of Topic B). Such embodiments may also facilitate client-side caching and improve inter-system communications.

Further yet, while disclosures herein can refer to an entropy, other variable types can be used instead. Such variables can measure a degree of variation (e.g., a standard deviation or variance) and/or predictability.

Further still, while disclosures herein can refer to selection of a single topic, techniques can be extended to select a group of topics. The group of topics can include multiple topics. Analysis can proceed according to disclosures herein, and can include (for example) assessing entropies of potential sequences including the group and evaluating proportions (relative to target proportions) of topics in the group within a potential sequence or past sequence.

It will also be appreciated that, in some instances, entropy and proportion analysis may fail to indicate a preferential topic (e.g., due to multiple topics corresponding to same scores). In these instances, a pseudo-random selection can be used to select from amongst the "tied" topics.

EXAMPLES

Example 1

Target proportions for four topics were assigned as follows: ADD=10%, SUB=20%, MUL=40%, and DIV=30%. A weighted pseudo-random selection was used to generate a sequence (length=10) for these four topics. The following three sequences were generated. For each sequence, the Shannon entropy was calculated using the entire sequence. Further, each sequence was used to generate for sequence portions—each sequence portion having a length of four (as there are four available topics) and being shifted one topic within the sequence relative to any previous portion. The Shannon entropy was calculated for each portion and averaged across portions to produce an average inter-frame entropy.

A first sequence generated was: [MUL, DIV, DIV, DIV, DIV, ADD, ADD, DIV, MUL, DIV]. This sequence's entropy was 1.4. The sequence's average inter-frame entropy was 0.9. The proportions for the four topics were: {ADD=0.2, SUB=0.0, MUL=0.2, DIV=0.6}.

A second sequence generated was: [SUB, MUL, MUL, MUL, SUB, MUL, ADD, SUB, DIV, DIV]. This sequence's entropy was 1.8. The sequence's average inter-frame entropy was 1.3. The proportions for the four topics were: {ADD=0.1, SUB=0.3, MUL=0.4, DIV=0.2}.

A third sequence generated was: [MUL, MUL, MUL, MUL, MUL, DIV, MUL, MUL, SUB, DIV]. This sequence's entropy was 1.2. The sequence's average inter-frame entropy was 0.8. The proportions for the four topics were: {ADD=0.0, SUB=0.1, MUL=0.7, DIV=0.2}.

Thus, the variation and proportions of the sequences is inconsistent, and proportions can be dramatically different than target proportions.

Example 2

Three additional sequences were analyzed using a same analysis. Target proportions were the same as for example 1.

A fourth sequence was: [MUL, MUL, MUL, MUL, DIV, DIV, DIV, SUB, SUB, ADD]. This sequence's entropy was 1.8. The sequence's average inter-frame entropy was 0.85. The proportions for the four topics were: {ADD=0.1, SUB=0.2, MUL=0.4, DIV=0.3}. Thus, this sequence achieved the target proportions but has low variation.

A fifth sequence was: [MUL, DIV, SUB, ADD, MUL, DIV, SUB, ADD, MUL, DIV]. This sequence's entropy was 2.0. The sequence's average inter-frame entropy was 2.0. The proportions for the four topics were: {ADD=0.2, SUB=0.2, MUL=0.3, DIV=0.3}. Thus, this sequence achieved the high variation but failed to capture the target proportions.

A sixth sequence was: [MUL, DIV, MUL, SUB, DIV, ADD, MUL, SUB, DIV, MUL]. This sequence's entropy was 1.8. The sequence's average inter-frame entropy was 1.8. The proportions for the four topics were: {ADD=0.1, SUB=0.2, MUL=0.4, DIV=0.3}. Thus, this sequence achieved high variation and the target proportions.

Example 3

A simple sequence of [MUL, SUB, DIV] was used to illustrate definitions of delta metrics. Target proportions were the same as for example 1.

The proportion-delta metrics were calculated as the target proportion minus the actual proportion. Thus, the proportion-delta metrics were: {ADD=0.1, SUB=−0.133, MUL=0.667, DIV=−0.333}.

The standard deviation and mean of the proportion-delta metrics were calculated. Normalized proportion-delta metrics were defined by subtracting the mean proportion-delta metric from each proportion-delta metric and dividing the difference by the standard deviation; this value was then rounded to the nearest integer. The normalized proportion-delta metrics were: {ADD=1.0, SUB=−2.0, MUL=1.0, DIV=−1.0}.

Entropy metric for each topic was determined by calculating the Shannon entropy for a potential sequence equal to the three-topic sequence with the topic added as the fourth topic. The entropy metrics were: {ADD=2.0, SUB=1.5, MUL=1.5, DIV=1.5}.

The standard deviation and mean of the entropy metrics were calculated. Normalized entropy metrics were defined by subtracting the mean entropy metric from each entropy metric and dividing the difference by the standard deviation; this value was then rounded to the nearest integer. The normalized entropy metrics were: {ADD=2.0, SUB=−1.0, MUL=−1.0, DIV=−1.0}.

A score was calculated for each topic by summing the respective normalized metrics. The scores were: {ADD=3.0, SUB=−3.0, MUL=0.0, DIV=−2.0}. A topic with the highest score was thus identified as "ADD", and accordingly, "ADD" was added to the sequence.

Example 4

A seventh sequence was generated using the variable definitions and techniques identified in example 3 (and using the average entropy calculations described herein). Target proportions were the same as for example 1.

The seventh sequence was: [MUL, SUB, DIV, ADD, MUL, DIV, SUB, MUL, DIV, MUL]. This sequence's entropy was 1.8. The sequence's average inter-frame entropy was 1.7. The proportions for the four topics were: {ADD=0.1, SUB=0.2, MUL=0.4, DIV=0.3}. Thus, this sequence achieved the target proportions but has high variation.

The target proportions were also used to generate 100 different sequences of length 10 based using a weighted random selection. For each sequence, an entropy, average inter-frame entropy and topic proportions were calculated. These variables were then averaged. The average entropy was 1.6. The average average inter-frame entropy was 1.2. The average properties for the topics were: {ADD=0.125, SUB=0.199, MUL=0.385, DIV=0.1291}. Thus, the entropy-based approach better conformed to target proportions and achieved higher entropies.

Figure 8:
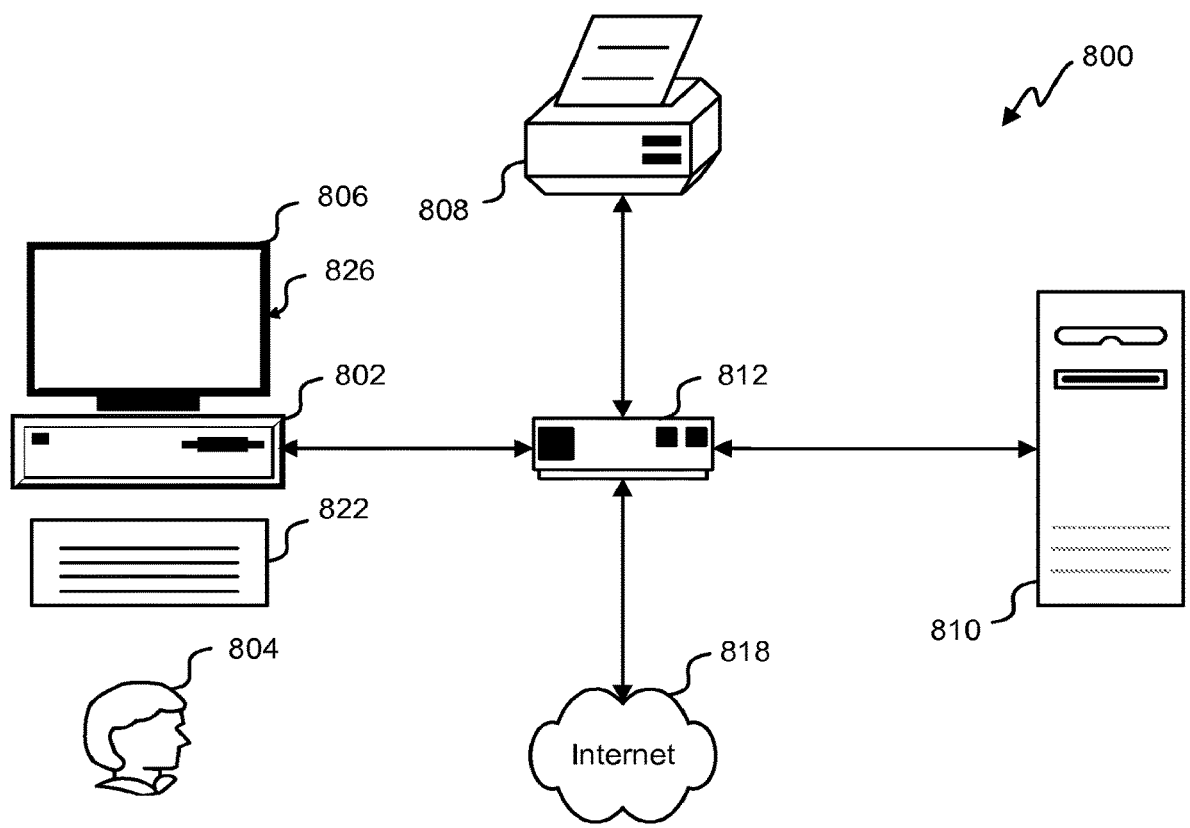
FIG. 8 depicts a block diagram of an embodiment of a computer system.

Referring next to FIG. 8, an exemplary environment with which embodiments can be implemented is shown with a computer system 800 that can be used by a designer 804 to design, for example, electronic designs. The computer system 800 can include a computer 802, keyboard 822, a network router 812, a printer 808, and a monitor 806. The monitor 806, processor 802 and keyboard 822 are part of a computer system 826, which can be a laptop computer, desktop computer, handheld computer, mainframe computer, etc. Monitor 806 can be a CRT, flat screen, etc.

A designer 804 can input commands into computer 802 using various input devices, such as a mouse, keyboard 822, track ball, touch screen, etc. If the computer system 800 comprises a mainframe, a designer 804 can access computer 802 using, for example, a terminal or terminal interface. Additionally, computer system 826 can be connected to a printer 808 and a server 810 using a network router 812, which can connect to the Internet 818 or a WAN.

Server 810 can, for example, be used to store additional software programs and data. In one embodiment, software implementing the systems and methods described herein can be stored on a storage medium in server 810. Thus, the software can be run from the storage medium in server 810.

In another embodiment, software implementing the systems and methods described herein can be stored on a storage medium in computer 802. Thus, the software can be run from the storage medium in computer system 826. Therefore, in this embodiment, the software can be used whether or not computer 802 is connected to network router 812. Printer 808 can be connected directly to computer 802, in which case, computer system 826 can print whether or not it is connected to network router 812.

Figure 9:
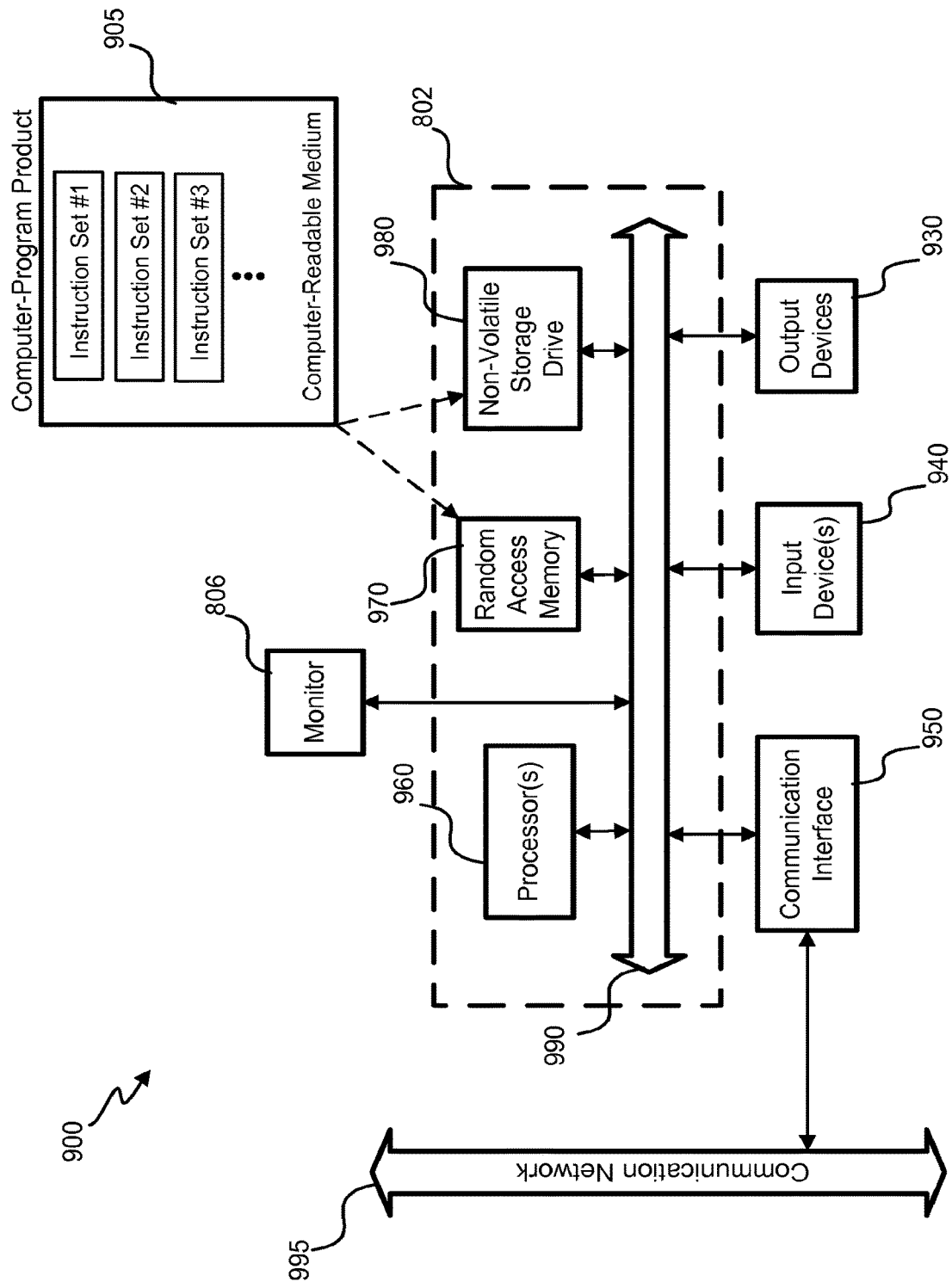
FIG. 9 depicts a block diagram of an embodiment of a special-purpose computer system.

With reference to FIG. 9, an embodiment of a special-purpose computer system 900 is shown. Educational content-selection engine 150 and/or any components thereof are examples of a special-purpose computer system 900. Thus, for example, one or more special-purpose computer systems 900 can be used to provide the function of one or more of content manager 205, learner-specific topic availer 225 and entropy-based sequence engine 250. The above methods can be implemented by computer-program products that direct a computer system to perform the actions of the above-described methods and components. Each such computer-program product can comprise sets of instructions (codes) embodied on a computer-readable medium that directs the processor of a computer system to perform corresponding actions. The instructions can be configured to run in sequential order, or in parallel (such as under different processing threads), or in a combination thereof. After loading the computer-program products on a general purpose computer system 826, it is transformed into the special-purpose computer system 900.

Special-purpose computer system 900 comprises a computer 802, a monitor 806 coupled to computer 802, one or more additional user output devices 930 (optional) coupled to computer 802, one or more user input devices 940 (e.g., keyboard, mouse, track ball, touch screen) coupled to computer 802, an optional communications interface 950 coupled to computer 802, a computer-program product 905 stored in a tangible computer-readable memory in computer 802. Computer-program product 905 directs system 900 to perform the above-described methods. Computer 802 can include one or more processors 960 that communicate with a number of peripheral devices via a bus subsystem 990. These peripheral devices can include user output device(s) 930, user input device(s) 940, communications interface 950, and a storage subsystem, such as random access memory (RAM) 970 and non-volatile storage drive 980 (e.g., disk drive, optical drive, solid state drive), which are forms of tangible computer-readable memory.

Computer-program product 905 can be stored in non-volatile storage drive 990 or another computer-readable medium accessible to computer 802 and loaded into memory 970. Each processor 960 can comprise a microprocessor, such as a microprocessor from Intel® or Advanced Micro Devices, Inc®, or the like. To support computer-program product 905, the computer 802 runs an operating system that handles the communications of product 905 with the above-noted components, as well as the communications between the above-noted components in support of the computer-program product 905. Exemplary operating systems include Windows® or the like from Microsoft Corporation, Solaris® from Sun Microsystems, LINUX, UNIX, and the like.

User input devices 940 include all possible types of devices and mechanisms to input information to computer system 802. These can include a keyboard, a keypad, a mouse, a scanner, a digital drawing pad, a touch screen incorporated into the display, audio input devices such as voice recognition systems, microphones, and other types of input devices. In various embodiments, user input devices 940 are typically embodied as a computer mouse, a trackball, a track pad, a joystick, wireless remote, a drawing tablet, a voice command system. User input devices 940 typically allow a user to select objects, icons, text and the like that appear on the monitor 806 via a command such as a click of a button or the like. User output devices 930 include all possible types of devices and mechanisms to output information from computer 802. These can include a display (e.g., monitor 806), printers, non-visual displays such as audio output devices, etc.

Communications interface 950 provides an interface to other communication networks and devices and can serve as an interface to receive data from and transmit data to other systems, WANs and/or the Internet 818. Embodiments of communications interface 950 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 950 can be coupled to a computer network, to a FireWire® bus, or the like. In other embodiments, communications interface 950 can be physically integrated on the motherboard of computer 802, and/or can be a software program, or the like.

RAM 970 and non-volatile storage drive 980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 970 and non-volatile storage drive 980 can be configured to store the basic programming and data constructs that provide the functionality of various embodiments of the present invention, as described above.

Software instruction sets that provide the functionality of the present invention can be stored in RAM 970 and non-volatile storage drive 980. These instruction sets or code can be executed by processor(s) 960. RAM 970 and non-volatile storage drive 980 can also provide a repository to store data and data structures used in accordance with the present invention. RAM 970 and non-volatile storage drive 980 can include a number of memories including a main random access memory (RAM) to store of instructions and data during program execution and a read-only memory (ROM) in which fixed instructions are stored. RAM 970 and non-volatile storage drive 980 can include a file storage subsystem providing persistent (non-volatile) storage of program and/or data files. RAM 970 and non-volatile storage drive 980 can also include removable storage systems, such as removable flash memory.

Bus subsystem 990 provides a mechanism to allow the various components and subsystems of computer 802 communicate with each other as intended. Although bus subsystem 990 is shown schematically as a single bus, alternative embodiments of the bus subsystem can utilize multiple busses or communication paths within computer 802.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system, comprising:
a database coupled to a network and storing:
a plurality of past sequences of educational software content objects, each associated with a file type; and
a plurality of educational-item file types;
a first client user device coupled to a network, and running a software application receiving, from a user interface, at least one user input including:
a set of educational software content objects; and
a target proportion of the file type within the set of educational software content objects;
a server comprising a computing device coupled to the network and including at least one processor executing within a memory instructions which, when executed, cause the system to:
receive, from the first client user device, the set of educational software content objects and the target proportion;
determine, according to at least one characteristic of each of the set of educational software content objects, the file type;
automatically generate a metadata identifying a file type identifier for each educational software content object in the set of educational software objects;
select a past sequence from the plurality of past sequences within the database;
identify, within the past sequence, a series of file type identifiers;
calculate a score for selecting an educational-item file type from a set of educational-item file types by:
generating a potential sequence that automatically appends the file type identifier to the past sequence;
determining an entropy of the potential sequence; and
determining a total number of the file type identifier in the past sequence or the potential sequence;
select the educational-item file type from the set of educational-item file types in the database, according to the score;
append the educational-item file type to the past sequence;
identify, within the set of educational software content objects, a plurality of educational software content objects including the metadata matching the educational-item file type;
select, using a random number generator, an educational software content object from the plurality of educational software content objects in the database;
determine a sequence of previously presented educational content software objects on a second client user device to a user operating the second client user device; and
transmit the educational software content object selected by the server to the second client user device for display on the second user device.

2. The system of claim 1, wherein the instructions further cause the system to:
determine a past-sequence entropy of the past sequence;
define an entropy-delta metric for each of the set of educational-item file types according to a difference between the determined entropy and the past-sequence entropy; and
calculate the score based on the entropy-delta metric.

3. The system of claim 1, wherein the instructions further cause the system to:
define a proportion-delta metric for each of the set of educational-item file types according to a difference between the target proportion and a determined proportion; and
calculate the score based on the proportion-delta metric.

4. The system of claim 1, wherein the instructions further cause the system to:
generate a normalized entropy metric for each of the educational-item file types, according to a determined entropy, a normalization factor, and at least one entropy determined for a plurality of additional educational-item file types; and
generate a normalized proportion metric for each of the educational-item file types according to a determined proportion, the normalization factor, and a plurality of proportions determined for the plurality of additional education-item file types.

5. The system of claim 1, wherein the instructions further cause the system to display the educational software content object on the second client user device.

6. The system of claim 1, wherein each educational-item file type in the set of educational-item file types includes an educational content object type.

7. The system of claim 1, wherein the instructions further cause the system to:
assign accessibility of each of the educational-item file types to a learner;
monitor performance of the learner;
modify the set of educational-item file types to include a new educational-item file type or remove an existing educational-item file type from the set of educational-item file types; and
evaluate the set of educational-item file types as modified to include a second educational-item file type in the potential sequence.

8. A system, comprising:
a server comprising a computing device coupled to a network and including at least one processor executing within a memory instructions which, when executed, cause the system to:
receive, from the first client user device coupled to the network:
a set of educational software content objects; and
a target proportion of a file type within the set of educational software content objects;
determine, according to at least one characteristic of each of the set of educational software content objects, the file type;
automatically generate a metadata identifying a file type identifier for each educational software content object in the set of educational software objects;
select a past sequence from a plurality of past sequences of educational software content objects, each associated with a file type, and stored within a database coupled to the network;

identify, within the past sequence, a series of file type identifiers;
calculate a score for selecting an educational-item file type from a plurality of educational-item file types stored in the database by:
generating a potential sequence that automatically appends the file type identifier to the past sequence;
determining an entropy of the potential sequence; and
determining a total number of the file type identifier in the past sequence or the potential sequence;
select the educational-item file type from the set of educational-item file types in the database, according to the score;
append the educational-item file type to the past sequence;
identify, within the set of educational software content objects, a plurality of educational software content objects including the metadata matching the educational-item file type;
select, using a random number generator, an educational software content object from the plurality of educational software content objects in the database;
determine a sequence of previously presented educational content software objects on a second client user device to a user operating the second client user device; and
transmit the educational software content object selected by the server to the second client user device for display on the second user device.

9. The system of claim 8, wherein the instructions further cause the system to:
determine a past-sequence entropy of the past sequence;
define an entropy-delta metric for each of the set of educational-item file types according to a difference between the determined entropy and the past-sequence entropy; and
calculate the score based on the entropy-delta metric.

10. The system of claim 8, wherein the instructions further cause the system to:
define a proportion-delta metric for each of the set of educational-item file types according to a difference between the target proportion and a determined proportion; and
calculate the score based on the proportion-delta metric.

11. The system of claim 8, wherein the instructions further cause the system to:
generate a normalized entropy metric for each of the educational-item file types, according to a determined entropy, a normalization factor, and at least one entropy determined for a plurality of additional educational-item file types; and
generate a normalized proportion metric for each of the educational-item file types according to a determined proportion, the normalization factor, and a plurality of proportions determined for the plurality of additional education-item file types.

12. The system of claim 8, wherein the instructions further cause the system to display the educational software content object on the second client user device.

13. The system of claim 8, wherein each educational-item file type in the set of educational-item file types includes an educational content object type.

14. The system of claim 8, wherein the instructions further cause the system to:
assign accessibility of each of the educational-item file types to a learner;
monitor performance of the learner;
modify the set of educational-item file types to include a new educational-item file type or remove an existing educational-item file type from the set of educational-item file types; and
evaluate the set of educational-item file types as modified to include a second educational-item file type in the potential sequence.

15. A method, comprising the steps of:
receiving, by a server comprising a computing device coupled to a network and including at least one processor executing within a memory instructions, from the first client user device coupled to the network:
a set of educational software content objects; and
a target proportion of a file type within the set of educational software content objects;
determining, by the server, according to at least one characteristic of each of the set of educational software content objects, the file type;
automatically generating, by the server, a metadata identifying a file type identifier for each educational software content object in the set of educational software objects;
selecting, by the server, a past sequence from a plurality of past sequences of educational software content objects, each associated with a file type, and stored within a database coupled to the network;
identifying, by the server, within the past sequence, a series of file type identifiers;
calculating, by the server a score for selecting an educational-item file type from a plurality of educational-item file types stored in the database by:
generating a potential sequence that automatically appends the file type identifier to the past sequence;
determining an entropy of the potential sequence; and
determining a total number of the file type identifier in the past sequence or the potential sequence;
selecting, by the server, the educational-item file type from the set of educational-item file types in the database, according to the score;
appending, by the server, the educational-item file type to the past sequence;
identifying, by the server, within the set of educational software content objects, a plurality of educational software content objects including the metadata matching the educational-item file type;
selecting, by the server using a random number generator, an educational software content object from the plurality of educational software content objects in the database;
determining, by the server, a sequence of previously presented educational content software objects on a second client user device to a user operating the second client user device; and
transmitting, by the server, the educational software content object selected by the server to the second client user device for display on the second user device.

16. The method of claim 15 further comprising the steps of:
determining, by the server, a past-sequence entropy of the past sequence;
defining, by the server, an entropy-delta metric for each of the set of educational-item file types according to a difference between the determined entropy and the past-sequence entropy; and calculate the score based on the entropy-delta metric.

17. The method of claim 15, further comprising the steps of:

defining, by the server, a proportion-delta metric for each of the set of educational-item file types according to a difference between the target proportion and a determined proportion; and calculating, by the server, the score based on the proportion-delta metric.

18. The method of claim 15, further comprising the steps of:

generating, by the server, a normalized entropy metric for each of the educational-item file types, according to a determined entropy, a normalization factor, and at least one entropy determined for a plurality of additional educational-item file types; and generating, by the server, a normalized proportion metric for each of the educational-item file types according to a determined proportion, the normalization factor, and a plurality of proportions determined for the plurality of additional education-item file types.

19. The method of claim 15, wherein each educational-item file type in the set of educational-item file types includes an educational content object type.

20. The method of claim 15, further comprising the steps of:

assigning, by the server, accessibility of each of the educational-item file types to a learner;

monitoring, by the server, performance of the learner;

modifying, by the server, the set of educational-item file types to include a new educational-item file type or remove an existing educational-item file type from the set of educational-item file types; and evaluating, by the server, the set of educational-item file types as modified to include a second educational-item file type in the potential sequence.

* * * * *